US012597107B2

(12) United States Patent
Grodsky et al.

(10) Patent No.: US 12,597,107 B2
(45) Date of Patent: Apr. 7, 2026

(54) FLUORESCENT SECURITY GLASS

(71) Applicant: Honeywell Federal Manufacturing & Technologies, LLC, Kansas City, MO (US)

(72) Inventors: Rachel Leigh Grodsky, Raymore, MO (US); Richard Brow, Rolla, MO (US); Melissa Malone Teague, Albuquerque, NM (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 18/389,767

(22) Filed: Dec. 19, 2023

(65) Prior Publication Data

US 2024/0135520 A1 Apr. 25, 2024

Related U.S. Application Data

(63) Continuation of application No. 18/174,958, filed on Feb. 27, 2023, now Pat. No. 11,875,499.

(60) Provisional application No. 63/314,748, filed on Feb. 28, 2022.

(51) Int. Cl.
*G06T 7/00* (2017.01)

(52) U.S. Cl.
CPC .................................. *G06T 7/0002* (2013.01)

(58) Field of Classification Search
CPC ............... G06T 7/0002; G01N 21/958; G01N 21/6456; C03C 4/12; C03C 10/00; C03C 14/006; C03C 2214/06
See application file for complete search history.

(56) References Cited

U.S. PATENT DOCUMENTS

| | | | |
|---|---|---|---|
| 6,403,286 B1 * | 6/2002 | Bellman | C03C 10/00 430/311 |
| 2003/0009683 A1 * | 1/2003 | Schwenck | G06F 21/87 713/194 |
| 2003/0194578 A1 * | 10/2003 | Tam | D21H 21/48 428/323 |
| 2004/0145661 A1 * | 7/2004 | Murakami | H04N 1/32144 348/222.1 |
| 2006/0131518 A1 * | 6/2006 | Ross | G06V 10/143 250/556 |
| 2007/0047287 A1 * | 3/2007 | Hell | G11B 7/0045 365/129 |
| 2008/0197620 A1 * | 8/2008 | Spencer | B42D 25/29 283/81 |

(Continued)

*Primary Examiner* — Xuemei G Chen

(74) *Attorney, Agent, or Firm* — Erise IP, P.A.

(57) ABSTRACT

A tamper-evident glass and methods of using the tamper-evident glass are provided herein. The tamper-evident glass comprising at least a first plurality of tamper-evident elements, which may be unique or near unique to each manufacturing of tamper-evident glass. The initial state of tamper-evident glass and positioning of the plurality of tamper-evident elements may be mapped through digital scanning to create a digital file of the current state of the tamper-evident glass. The tamper-evident glass may be scanned again to create a new digital file for comparison and to determine if a tampering event has occurred. The tamper-evident elements may include any combination of inorganic fluorescent material, crystals grown through nucleation and crystallization, or added colorants.

20 Claims, 7 Drawing Sheets

(56) References Cited

U.S. PATENT DOCUMENTS

| | | | | |
|---|---|---|---|---|
| 2011/0140004 | A1* | 6/2011 | Decroupet | C03C 17/007 |
| | | | | 428/29 |
| 2012/0161431 | A1* | 6/2012 | Vulpius | B29C 55/065 |
| | | | | 156/196 |
| 2013/0065746 | A1* | 3/2013 | Bayya | C03B 19/063 |
| | | | | 65/17.6 |
| 2013/0147938 | A1* | 6/2013 | McCloskey | G06Q 30/018 |
| | | | | 348/78 |
| 2013/0153789 | A1* | 6/2013 | Smith | G07D 7/1205 |
| | | | | 252/301.4 R |
| 2013/0260301 | A1* | 10/2013 | Yamauchi | C09D 11/50 |
| | | | | 430/105 |
| 2013/0321152 | A1* | 12/2013 | Schmidt | G08B 13/2451 |
| | | | | 340/572.1 |
| 2014/0230885 | A1* | 8/2014 | Fyson | H10K 39/12 |
| | | | | 136/251 |
| 2014/0288351 | A1* | 9/2014 | Jones | A61N 5/0624 |
| | | | | 607/90 |
| 2015/0018194 | A1* | 1/2015 | Li | C03C 3/095 |
| | | | | 501/38 |
| 2015/0360500 | A1* | 12/2015 | Lok | B42D 25/328 |
| | | | | 349/194 |
| 2016/0049057 | A1* | 2/2016 | Bobbitt, III | F16B 41/005 |
| | | | | 382/141 |
| 2016/0064624 | A1* | 3/2016 | Yoon | H01L 33/501 |
| | | | | 257/98 |
| 2016/0263931 | A1* | 9/2016 | Garnier | C09K 19/3861 |
| 2016/0333526 | A1* | 11/2016 | Macpherson | B42D 25/324 |
| 2017/0247289 | A1* | 8/2017 | Waldschmidt | B23K 26/082 |
| 2017/0341812 | A1* | 11/2017 | DeMartino | G06K 19/06037 |
| 2018/0004980 | A1* | 1/2018 | Kuczynski | G06F 21/72 |
| 2019/0005275 | A1* | 1/2019 | DiMaio | B32B 27/304 |
| 2020/0276854 | A1* | 9/2020 | Gardiner | B42D 25/364 |
| 2022/0028057 | A1* | 1/2022 | Xu | G07D 7/12 |
| 2022/0042905 | A1* | 2/2022 | Salaita | G01N 21/31 |
| 2022/0153630 | A1* | 5/2022 | Dejneka | C03B 25/02 |
| 2023/0070336 | A1* | 3/2023 | Boulmay | C23C 16/513 |
| 2023/0203264 | A1* | 6/2023 | Jiang | C08J 9/26 |
| | | | | 436/164 |

* cited by examiner

FLUORESCENT SECURITY GLASS

RELATED APPLICATIONS

This patent application is a continuation application claiming priority benefit, with regard to all common subject matter, of U.S. patent application Ser. No. 18/174,958, filed Feb. 27, 2023, and entitled "FLUORESCENT SECURITY GLASS" ("the '958 application"). The '958 application claims priority benefit, with regard to all common subject matter, of U.S. Provisional Patent Application No. 63/314, 748, filed Feb. 28, 2022, and entitled "FLUORESCENT SECURITY GLASS." The above-referenced applications are hereby incorporated by reference in their entirety into the present application.

STATEMENT OF GOVERNMENTAL SUPPORT

This invention was made with government support under DE-NA0002839 awarded by the United States Department of Energy/National Nuclear Security Administration. The government has certain rights in the invention.

BACKGROUND

1. Field

Embodiments of the invention relate to a system having a tamper-evident, security glass comprising fluorescent compounds providing visual indication of tampering. More specifically, inorganic fluorescent material may be added to a glass mixture prior to the formation of glass and after formation, unique patterns of the fluorescent material may be mapped using digital imaging for security purposes.

2. Related Art

The use of glass as a tamper-evident or security feature is well-known in security applications. Glass is oftentimes used to either cover valuable or sensitive objects or may be used as a security layer in a multi-layered setting. Security glass is typically used as either an active indicator, providing an immediate indication if the glass has been tampered with, e.g., visible breaks or cracks in the glass; or as a passive indicator, where there is not an immediate indication if the glass has been tampered with, e.g., microcracks. However, adverse persons have become increasingly sophisticated, and are now able to replace security glass with an identical copy, circumventing the security provided by the tamper-evident glass. Through such replacement, a tampering event may go unnoticed for an extended period of time, compromising recovery attempts or other methods of mitigating damage caused by the tampering.

Accordingly, a need exists for security or anti-tamper glass that may provide to a user a quick and identifiable indication if a tampering event has occurred. Furthermore, a need further exists for a tamper-evident or anti-tamper glass that provides a unique identifier, providing for a quick and identifiable method of determining whether the glass has been replaced with a recreation.

SUMMARY

Embodiments of the invention solve the above-mentioned problems by providing an anti-tamper or tamper-evident glass comprising one or more tamper-evident elements. In some embodiments, the tamper-evident elements may comprise a unique or near unique pattern for each manufacturing of the tamper-evident glass, providing for a security tool that is virtually impossible to recreate by an adverse party.

A first embodiment is directed to a method of detecting tampering of an object having a tamper-evident glass for providing a visual indication of a tampering, the method comprising, performing a first inspection of a tamper-evident glass to create a baseline of an initial state of the tamper-evident glass, wherein the tamper-evident glass comprises a plurality of inorganic fluorescent objects throughout a dimension of the tamper-evident glass. Following the first inspection, performing a second inspection of the object comprising the tamper-evident glass to create a later status of the tamper-evident glass. Finally, comparing the baseline to the later status to determine whether an attempted tampering has occurred.

A second embodiment is directed to a tamper-evident glass comprising a base piece of glass; a first plurality of tamper-evident elements; a first patterning, wherein the first patterning consists of the first plurality of tamper-evident elements; a second plurality of tamper-evident elements; and a second patterning, wherein the second patterning consists of the second plurality of tamper-evident elements. Additionally, the first patterning and the second patterning may be mapped in a digital file via a digital scanning apparatus.

A third embodiment is directed to a tamper-evident glass comprising: a base piece of glass and a first plurality of tamper-evident elements, wherein the first plurality of tamper-evident elements comprises inorganic fluorescent object and a first patterning, wherein the first patterning consists of the first plurality of tamper-evident elements. The tamper-evident glass further comprises a second plurality of tamper-evident elements, wherein the second plurality of tamper-evident elements comprises crystals grown in the base piece of glass and a second patterning, wherein the second patterning consists of the second plurality of tamper-evident elements. The tamper-evident glass even further comprises a third plurality of tamper-evident elements, wherein the third plurality of tamper-evident elements comprises pigmented colorants; and a third patterning, wherein the third patterning consists of the third plurality of tamper-evident elements.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
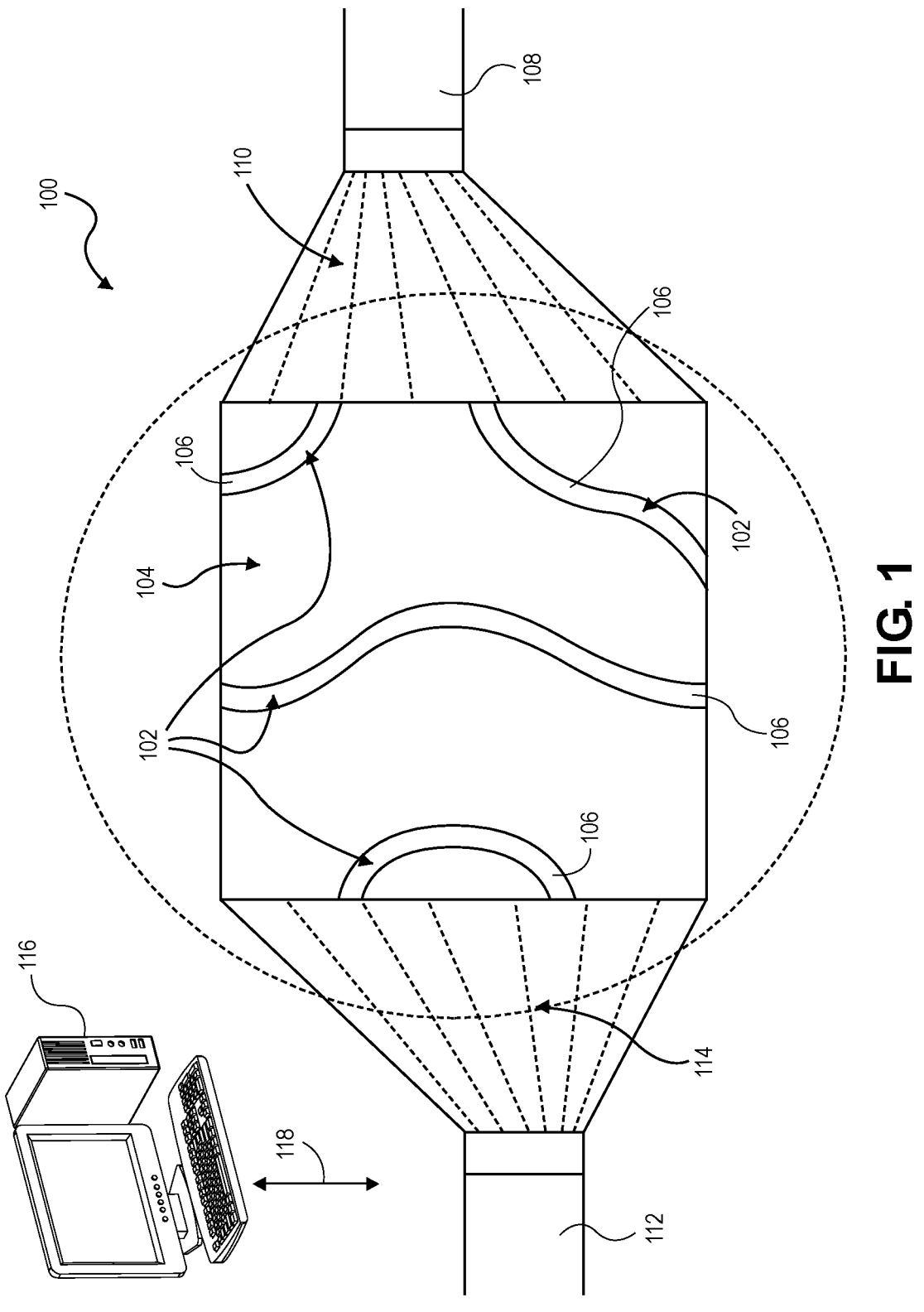
FIG. 1 is an exemplary system configuration of the tamper-evident glass and digital scanning apparatus.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Broadly, embodiments of the present invention are directed to an anti-tamper or tamper-evident glass, that provides a visual indication in the event that a tampering attempt has occurred. In some embodiments, the tamper-evident glass may comprise one or more tamper-evident elements, providing an indication of a tampering. In some embodiments, the tamper-evident elements may be inorganic fluorescent material dispersed throughout the dimensions of the tamper-evident glass. The inorganic fluorescent material may be energized by a light source and the pattern of the inorganic fluorescent material may be recorded through a digital scanning. After a period of time, the tamper-evident glass may be scanned again, and a determination may be made on whether the glass has been tampered with. In further embodiments, the tamper-evident glass may optionally or additionally comprise crystals grown within the dimensions of the tamper-evident glass. Such crystals may be formed through the process of nucleation and crystallization, providing for unique or near unique distributions, sizes, and patterns of crystals. In even further embodiments, the tamper-evident elements may be colorants added to the glass powder mixture of the glass, which after mixture and formation provide for unique or near unique patterns or distributions of colorants through the tamper-evident glass.

Turning now to the figures, exemplary embodiments of a tamper-evident glass 100 are shown and depicted. Tamper-evident glass 100 may be a piece of glass capable of providing a visual indication if the tamper-evident glass 100 has been subject to an attempted, or successful, tampering. Tamper-evident glass 100 may be constructed from any now known, or yet to be discovered glass. For example, tamper-evident glass 100 may be any commonly used glass, including for example soda-lime glass or borosilicate glass.

Furthermore, because tamper-evident glass 100 may be used in a variety of settings and applications, including for example as a tamper-evident feature in an electronic system, or as a loop seal, the size, shape, and dimensions of tamper-evident glass 100 may vary. For example, the illustrated embodiment of tamper-evident glass 100 depicts a generally planar and square or rectangular geometric design of tamper-evident glass 100. However, it will be appreciated that tamper-evident glass 100 may have any geometric shape or design and is not limited to the illustrated embodiments. Additionally, similar to the shape and design, the dimensions of tamper-evident glass 100 may likewise vary, depending on the embodiment. For example, for embodiments in which tamper-evident glass 100 is placed in an electronic assembly, tamper-evident glass 100 may comprise a length and width of about 0.5 mm to about 1.0 mm. The thickness of tamper-evident glass may also vary, and for example, may be about 0.1 mm to about 0.5 mm. Such exemplary dimensions are intended to by illustrative, and it will be appreciated that tamper-evident glass 100 may comprise a variety of shapes and dimensions depending on the desired application.

As further depicted, tamper-evident glass 100 may further comprise one or more tamper-evident elements 102, providing visual indicators of an attempted or successful tampering attempt. In some embodiments, tamper-evident elements 102 may be inorganic fluorescent material 104 added to tamper-evident glass 100, providing a visual anti-tampering or tamper-evident element to tamper-evident glass 100. Inorganic fluorescent material 104 may be an inorganic rare earth oxide for example. Non-limiting examples of rare earth oxides that inorganic fluorescent material 104 may be include: yttrium, lanthanum, cerium, praseodymium, neodymium, promethium, samarium, europium, gadolinium, terbium, dysprosium, holmium, erbium, thulium, ytterbium, lutetium, scandium. In some embodiments, the inorganic rare earth oxides may be substituted or replaced with other materials, including but not limited to uranium, selenium, cadmium, or other similar materials. In further embodiments, tamper-evident elements 102 may be another fluorescent material that is currently known or yet to be discovered, including for example, organic fluorescent material or other inorganic fluorescent materials.

In some embodiments, inorganic fluorescent material 104 may be in a powder form and added to a glass powder mixture during the glass making process. For example, in manufacturing a traditional soda-lime glass the glass mixture may comprise a mixture of raw chalk or calcium carbonate, soda ash or sodium carbonate, and silica or silicon dioxide. However, depending on the type of glass used for tamper-evident glass 100, the raw materials of the glass powder mixture may vary. Furthermore, the amount of inorganic fluorescent material 104 added to the glass powder mixture may vary and may be dependent on the amount of tamper-evident elements 102 present in tamper-evident glass 100. For example, inorganic fluorescent material 104 may constitute about 0.2% to about 15% of the total weight of the glass powder mixture.

In further embodiments, inorganic fluorescent material 104 may be in the form of balls, spheres, flat plates, slides, or other similar geometric designs. The spheres of inorganic fluorescent material 104 may vary in size, which may be dependent on factors such as the final thickness of tamper-evident glass 100. By way of non-limiting example, the spheres of inorganic fluorescent material 104 may comprise a circumference of about 0.4 mm to about 3.0 mm. However, it will be appreciated that in further embodiments, the spheres of inorganic fluorescent material 104 may be larger or smaller in circumference, and for example, inorganic fluorescent material 104 may have a circumference of about 1 inch to about 3 inches. Further, in embodiments in which inorganic fluorescent material 104 comprises a flat plate design, inorganic fluorescent material 104 may comprise about one-inch-long sides with a thickness of about 0.4 inches. After adding inorganic fluorescent material 104 to the glass powder mixture, whether inorganic fluorescent material is in powder form or in sphere form, the glass making process may continue as normal. Depending on the embodiment and on factors including the final design of tamper-evident glass 100 or the raw material, the glass manufacturing process may consist of any method of forming glass, including but not limited to core-forming, casting, blowing, mold-blowing, pattern-molding, or any other known or yet to be discovered method of forming glass.

In some embodiments, the distribution of tamper-evident elements 102 in the finally formed tamper-evident glass 100 may be distributed in random or intermittent placement. For example, in embodiments in which inorganic fluorescent material 104 is in a powder form and added to the glass powder mixture, inorganic fluorescent material 104 may be thoroughly mixed with the glass powder, and inorganic fluorescent material 104 may be intermittently distributed throughout tamper-evident glass 100 without a pre-determined pattern or distribution, and instead, may be distributed in a random manner. Furthermore, during thorough mixing, pockets of concentrated inorganic fluorescent material 104 may occur providing for a relatively consistent patterning 106 of inorganic fluorescent material 104. In further embodiments, inorganic fluorescent material 104 may be added at a later stage of the glass manufacturing process to provide a certain degree of specialized patterns. For example, by adding inorganic fluorescent material 104 after the glass powder mixture has been heated, patterning 106 may comprise a concentration of inorganic fluorescent material that resembles streaks or other shapes that may come about in a random manner. Accordingly, in embodiments in which inorganic fluorescent material 104 is dispersed in a random manner within tamper-evident glass 100, patterning 106 may be unique or near unique for each manufacturing of tamper-evident glass 100.

In further embodiments, the distribution of tamper-evident elements 102 in tamper-evident glass 100 may be distributed in a pre-determined manner, wherein patterning 106 may be a pre-determined shape or design. For example, in embodiments in which inorganic fluorescent material 104 comprises one or more spheres of fluorescent material, the spheres of inorganic fluorescent material 104 may be manipulated during the glass making process such that patterning 106 may be a pre-determined shape, size, and/or location within tamper-evident glass 100. Furthermore, patterning 106 may comprise more than one shape, such that tamper-evident glass 100 comprises two or more distinct patterns 106. The pre-determined shape of patterning 106 may correspond to a number of factors, including for example a specific product line, specific manufacturers, or other factors. Accordingly, in some embodiments, patterning 106 may be unique to a specific manufacturing of tamper-evident glass 100 or alternatively, patterning 106 may be selected from a catalog of pre-chosen designs of patterning 106.

In some embodiments, tamper-evident elements 102, after placement in tamper-evident glass 100, may be invisible or undetectable to a naked-eye observer. In other words, tamper-evident tape glass 100 may be indistinguishable from regular, or non-tamper-evident glass to a naked-eye observer. Accordingly, in some embodiments, tamper-evident elements 102 within tamper-evident glass 100 may only be visible through visual aids or other techniques for making tamper-evident elements 102 visible or otherwise detectable. For example, one such visual aid may be a light source 108 which may shine a light 110 towards tamper-evident glass 100. Light 110 from light source 108 may excite the tamper-evident elements 102 within tamper-evident glass 100, thereby making the tamper-evident elements 102 visible. By way of non-limiting example, light source 108 may be configured for emitting an ultraviolet light, which may be directed towards tamper-evident glass 100.

In some embodiments and depending on factors including but not limited to the material of tamper-evident elements 102 and/or the wavelength of light 110, after excitement by light 110, tamper-evident elements 102 may become visible to a naked-eye observer. In further embodiments, tamper-evident elements 102 may remain undetectable or invisible to a naked-eye observer after excitement but may be visible by a polarized lens. For example, a polarized lens may discern certain dyes or colorants included with tamper-evident elements 102. In even further embodiments, tamper-evident elements 102 may be invisible or non-detectable to a naked-eye observer but may be visible through a visual aid prior to excitement. For example, tamper-evident elements 102 may be visible through the use of a polarized lens, magnifier, or other similar apparatus. In some embodiments, the visibility of tamper-evident elements 102 may further be dependent on whether tamper-evident glass 100 is used as a passive security detector or an active security detector.

As further illustrated in FIG. 1, in some embodiments, the location and/or status of tamper-evident elements 102 and/or patterning 106 may be recorded for later comparison, such as for determining if a tampering attempt has taken place. For example, in some embodiments, a digital scanner 112, or other scanning apparatus may be used to cast a scanning light 114 or other wavelength towards tamper-evident glass 100, tamper-evident elements 102, and/or patterning 106. Digital scanner 112 and scanning light 114 may be used to create an electronic, digital, or other computerized scan of tamper-evident glass 100, tamper-evident elements 102, and/or patterning 106 for measuring and documenting the position and status of tamper-evident elements 102 and/or patterning 106. For example, digital scanner 112 may be used to scan one or more tamper-evident elements 102, patterning 106, or the entirety of tamper-evident glass 100 and create a digital file or image of the then current state of the scanned tamper-evident glass 100. Following the electronic or digital scan, the resulting digital file or image may then be uploaded and saved to an electronic data for storage and/or for later analysis. For example, in some embodiments, digital scanner 112 may be communicatively coupled to a computer 116 or other system comprising a processor. It will be appreciated that while the illustrated embodiment of FIG. 1 depicts computer 116 as a desktop computer, the illustrated embodiment is not a limiting feature of the present teachings, and computer 116 may be any computing device, including a laptop computer, a desktop computer, a smartphone, or a tablet. As described in greater detail below, computer 116 may be configured for performing analysis on the digital file or image of tamper-evident elements 102 and/or patterning 106. For example, in some embodiments, computer 116 may be a smartphone utilizing an application or other software programmed to analyze and compare tamper-evident glass 100, tamper-evident elements 102, and/or patterning 106.

In further embodiments, digital scanner 112 may be replaced with or used in conjunction with another recording apparatus, including for example a camera or video recorder. Similar to the digital file or image captured by digital scanner 112, the recording captured by the camera or video recorder may likewise by uploaded and saved on computer 116. Digital scanner 112, and/or other imaging apparatus, may be communicatively coupled to computer 116 through connection 118. In some embodiments, connection 118 may be an indirect connection, including for example a WiFi, Bluetooth, cellular, or other wireless connection. In further embodiments, connection 118 may be a direct connection, including for example ethernet, or other wired and direct connection. For example, digital scanner 112 may be a peripheral device that may be plugged into a smartphone.

Figure 2:
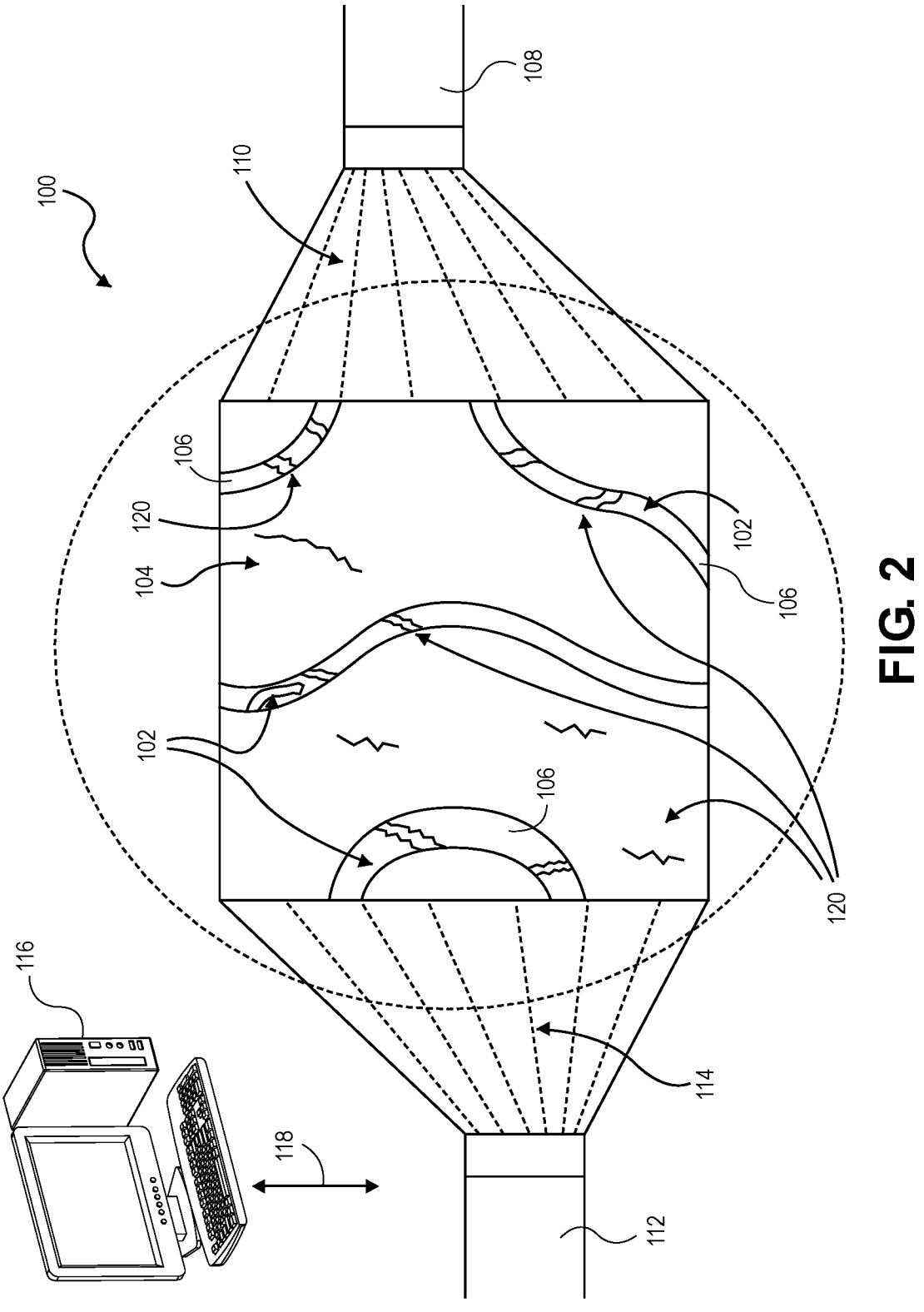
FIG. 2 is a top perspective view of a piece of tamper-evident glass after an attempted tampering.

Turning now to FIG. 2, an illustrative example of tamper-evident glass 100 following an attempted tampering is depicted. As illustrated, in some embodiments, following an attempted tampering, or a complete tampering, one or more of tamper-evident elements 102, or optionally tamper-evident glass 100, may be altered from a previous state. Accordingly, the creation of the digital file of image tamper-evident glass 100 may be used as a security tool or device for alerting of tampering events. In some embodiments, tamper-evident glass 100 may provide an indication if an attempted tampering has occurred. For example, after placement of tamper-evident glass 100 in its security application, a first digital scan may record the initial status of the tamper-evident elements 102, patterning 106, and/or tamper-evident glass 100. When initially placed, tamper-evident glass 100 may be free or devoid of any cracks, fractures, or stresses or alternatively, may comprise one or more cracks, fractures, or stresses. Accordingly, whether comprising one or more cracks or whether devoid of any cracks, the initial state of tamper-evident glass 100, tamper-evident elements 102, and/or patterning 106 may have an initial state captured and recorded by digital scanner 112. Following a period of time, the tamper-evident glass 100 may be scanned again by digital scanner 112 to determine whether any variation in tamper-evident glass 100, tamper-evident elements 102, and or patterning 106 has occurred, indicating that a tampering has taken place. For example, the presence of cracks, breaks, or fractures in tamper-evident glass 100 may be detected by digital scanner 112 and included in a new digital file or image created and transferred to computer 116. Upon transferring, computer 116 may compare the two digital files using a comparison software for identifying any difference between the first digital file and the second digital file.

Furthermore, in some embodiments, tamper-evident elements 102 may aid the comparison process by providing additional visual confirmation of tampering attempts. In some embodiments, tamper-evident elements 102 may provide for a clearer indication of cracks, fractures, or other breaks in tamper-evident glass 100 than if tamper-evident glass 100 was free or devoid of tamper-evident elements 102. For example, during an attempted tampering, a force may be applied to tamper-evident glass 100 causing a break, fracturing, or crack to the structure of tamper-evident glass 100. Tamper-evident elements 102 may indicate with greater visibility the areas that such breaks, fractures, or cracks occur. Accordingly, through such indication provided by tamper-evident elements 102, such breaks, fractures, or cracks may be more easily identifiable by digital scanner 112, providing for a more accurate digital file or image of tamper-evident glass 100 for comparison. For example, as illustrated in FIG. 2, following an attempted tampering event, at least one break 120 may be present in tamper-evident glass 100. In some embodiments, break 120 may occur in patterning 106, providing for a clear indication that tamper-evident glass 100 has been tampered with. In further embodiments, following an attempted tampering event, a plurality of breaks 120 may occur throughout tamper-evident glass 100, and each break 120 may be recorded through the digital scan by digital scanner 112.

Figure 3:
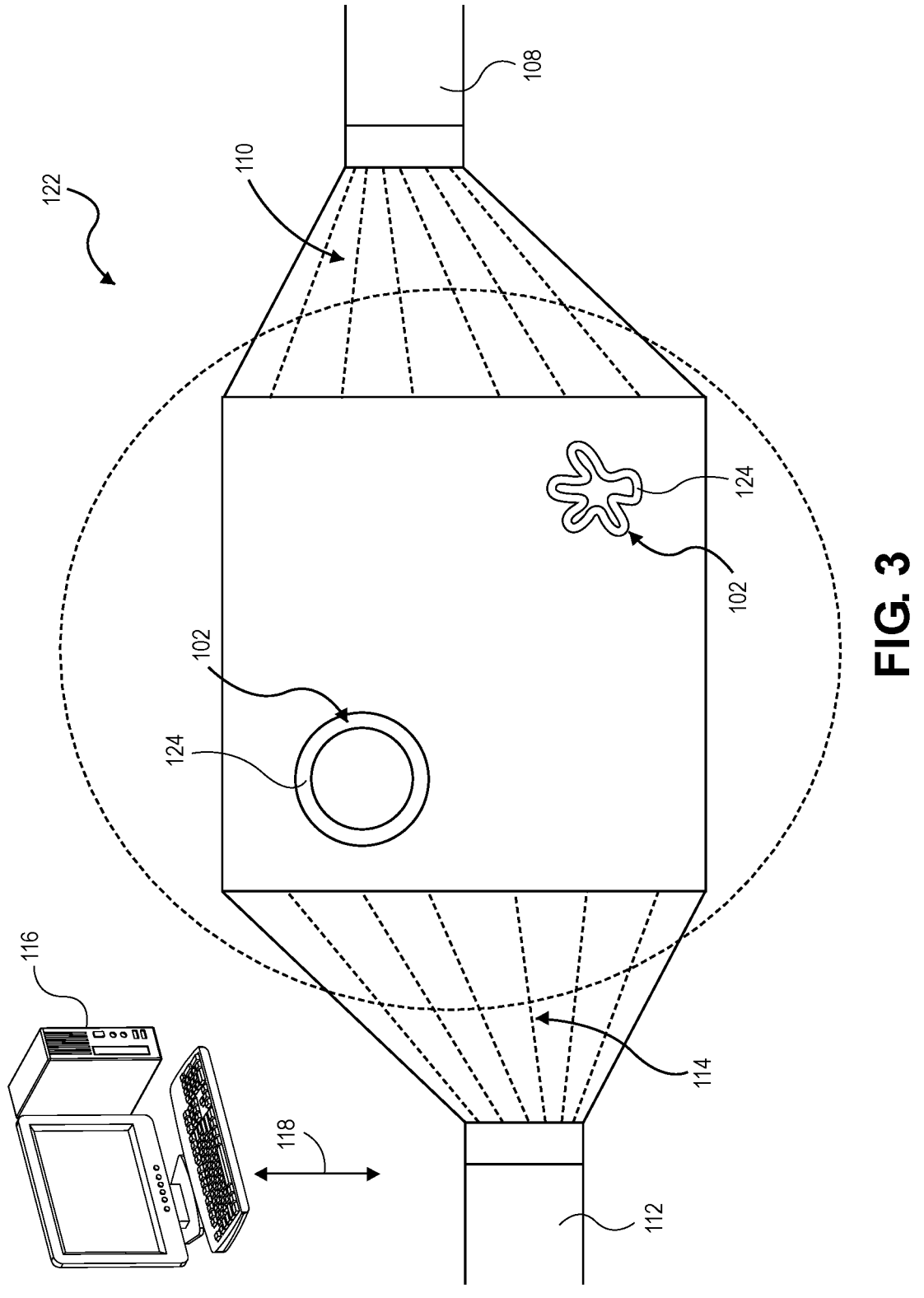
FIG. 3 is a top perspective view of a replacement piece of tamper-evident glass comprising a different pattering than the tamper-evident glass of FIGS. 1-2.

In some embodiments, tamper-evident glass 100 may provide an indication if a complete tampering has occurred. For example, some tampering events may comprise the removal of tamper-evident glass 100 and replacing it with a copy, rather than returning tamper-evident glass 100 in its original position. Accordingly, in addition to highlighting cracks, breaks, or fractures created during a tamper attempt, tamper-evident glass 100 may optionally and/or additionally provide an indication of tampering if tamper-evident glass 100 is replaced with a copy. As described above, in some embodiments, patterning 106 may be designed as having a pre-determined shape indicative of a certain manufacturer or product line, or alternatively, may have a random design created during the manufacturing process. In either case, tamper-evident glass 100 may have a first pattern 106 captured through digital scanning. Accordingly, through the digital scanning captured by digital scanner 112, or through other visual inspection, patterning 106 may be captured as a baseline for later comparison. For example, in some embodiments, an attempted tampering event may result in the removal of tamper-evident glass 100 from its original position or placement and replacement with a replacement glass 122. In some embodiments, replacement glass 122 may be an attempted copy of tamper-evident glass 100. Accordingly, in some embodiments, replacement glass 122 may comprise its own distinct patterning, including for example, replacement patterning 124 as depicted in FIG. 3. In further embodiments, the replacement glass 122 may be free or devoid of tamper-evident elements 102 and may likewise lack any patterning. In any case, the digital scanning conducted by digital scanner 112 may scan the replacement glass 122, record the placement of tamper-evident elements 102, or lack thereof, create a digital file of replacement glass 122, and store the digital file or image for comparison with the digital file or image of the originally placed tamper-evident glass 100.

Figure 4:
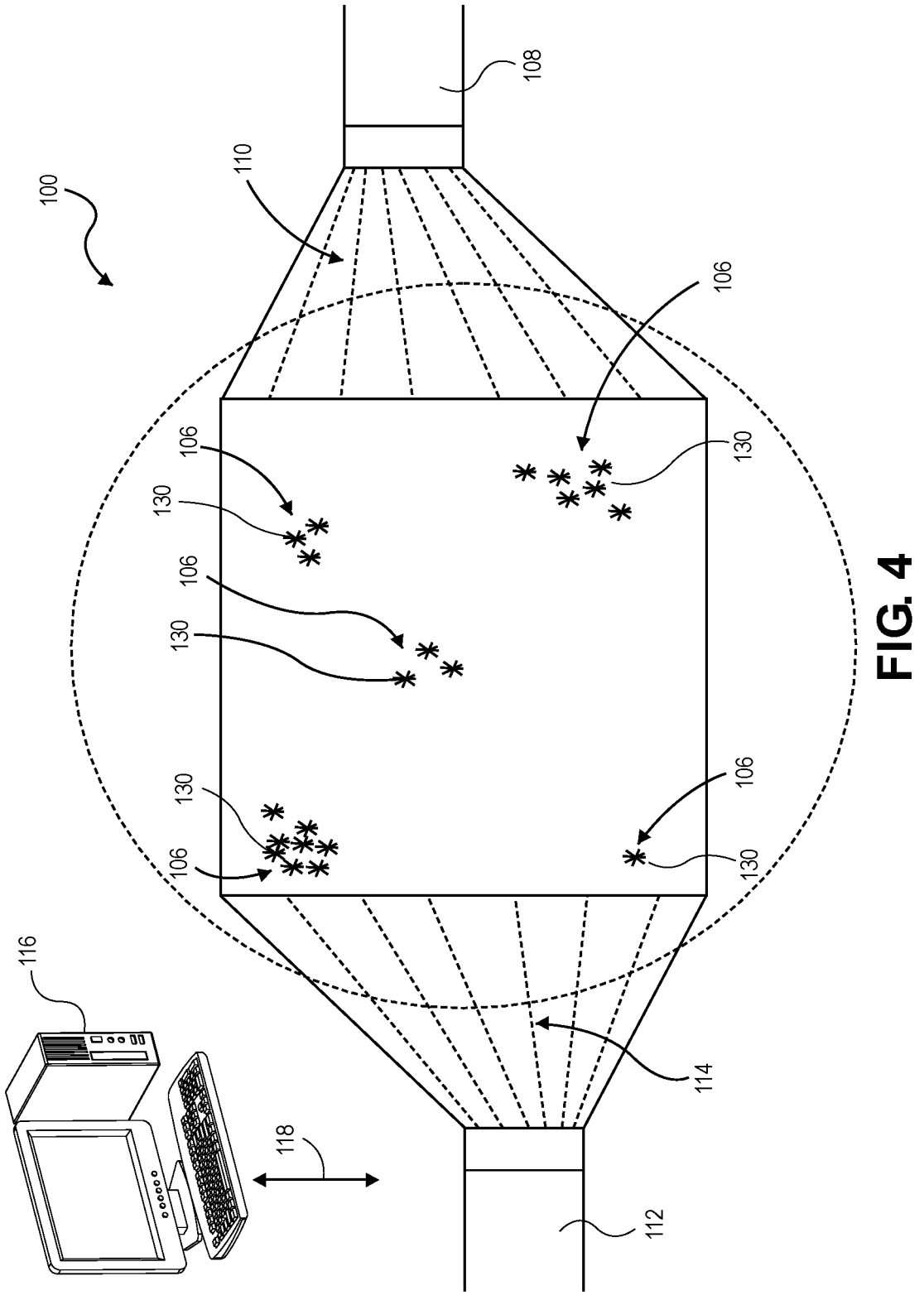
FIG. 4 is a top perspective view of a second embodiment of tamper-evident glass comprising crystals.

In some embodiments, in addition to, or in place of, inorganic fluorescent material 104, the tamper-evident elements may be one or more crystals, formed within the dimensions of tamper-evident glass 100. FIG. 4 depicts an exemplary embodiment of tamper-evident glass 100, wherein the one or more tamper-evident elements 102 are crystals 130. In some embodiments, crystals 130 may be located entirely within the dimensions of tamper-evident glass 100. Similar to inorganic fluorescent material 104 described above and in some embodiments, crystals 130 may be distributed randomly or intermittently throughout the dimensions of tamper-evident glass 100, or in other words, without a pre-determined location of placement. Accordingly, through such random or intermittent placement of crystals 130, each molded or formed piece of tamper-evident glass 100 comprising crystals 130 may be unique or near unique. In further embodiments, and similar to embodiments described above, as crystals 130 are formed in tamper-evident glass 100, natural clusters or groupings may occur, similar to patterning 106. Furthermore, in even further embodiments, crystals 130 may be selectively formed in such a manner as to create pre-determined clusters of formed crystals 130. In some embodiments, crystals 130 may be selectively positioned, placed, or induced to grow through any known, or yet to be discovered methods of crystal growth or formation. For example, one such method of selectively positioned crystallization may be achieved through a laser-induced method of crystallization. Through such selective placement, patterning, symbols, shapes, images, or other formations may be selectively controlled. For example, as described above, certain product lines or manufacturers may have a unique patterning 106 associated with tamper-evident glass 100, and such unique patterning 106 may be formed using crystals 130.

Crystals 130 may be formed using any known method of crystallization, including for example, nucleation, laser crystallization, or any other method of crystallization. However, it will be appreciated that the growing of crystals in glass is a still developing field, with advancements and new techniques continually being developed and implemented. Accordingly, as advancements in crystallization and nucleation continue to occur, the methods for growing crystals 130 in tamper-evident glass 100 may evolve with the technology and techniques. In a non-limiting exemplary embodiment, crystals 130 may be grown and formed in tamper-evident glass through a two-step process of nucleation and crystallization. For example, during the manufacturing or forming of tamper-evident glass 100, nucleating agents may be added may be added to the glass powder mixture during the initial mixing of raw materials. Examples of nucleating agents that may be added to the glass powder mixture include, but are not limited to $TiO_2$, $ZrO_2$, $Fe_2O_3$, $Cr_2O_3$, NiO, ZnO, $V_2O_5$, $P_2O_5$ and $Ta_2O_5$. Once the nucleating agents have been added to the glass powder, the glass powder mixture may be heated for forming tamper-evident glass 100 using traditional methods of glass forming as described above. Accordingly, the nucleating agents may be dispersed throughout the dimensions of tamper-evident glass 100 and gather in clusters. Following the formation of clusters of nucleating agents, stable nuclei may be formed, with the stable nuclei being the site of eventual crystal growth. The size of the stable nuclei may be dependent on a variety of factors, including but not limited to the specific nucleating agent used, the temperature the tamper-evident glass 100 is heated to, and the supersaturation of the tamper-evident glass 100, among other factors. Following the formation of the stable nuclei, the tamper-evident glass 100 may be maintained at a lower temperature than the melting point of tamper-evident glass 100, including for example near or at the glass transition temperature of tamper-evident glass 100. While maintaining the temperature of tamper-evident glass 100, crystals 130 may begin to grow at the stable nuclei sites. The size of the crystals 130 formed in tamper-evident glass 100 may have a maximum size, which may be determined on a variety of factors, including for example the specific nucleating agent used. In some embodiments, following formation, crystals 130 may comprise either an opaque coloring or a transparent coloring, which may be dependent on the materials used for forming crystals 130.

Figure 5:
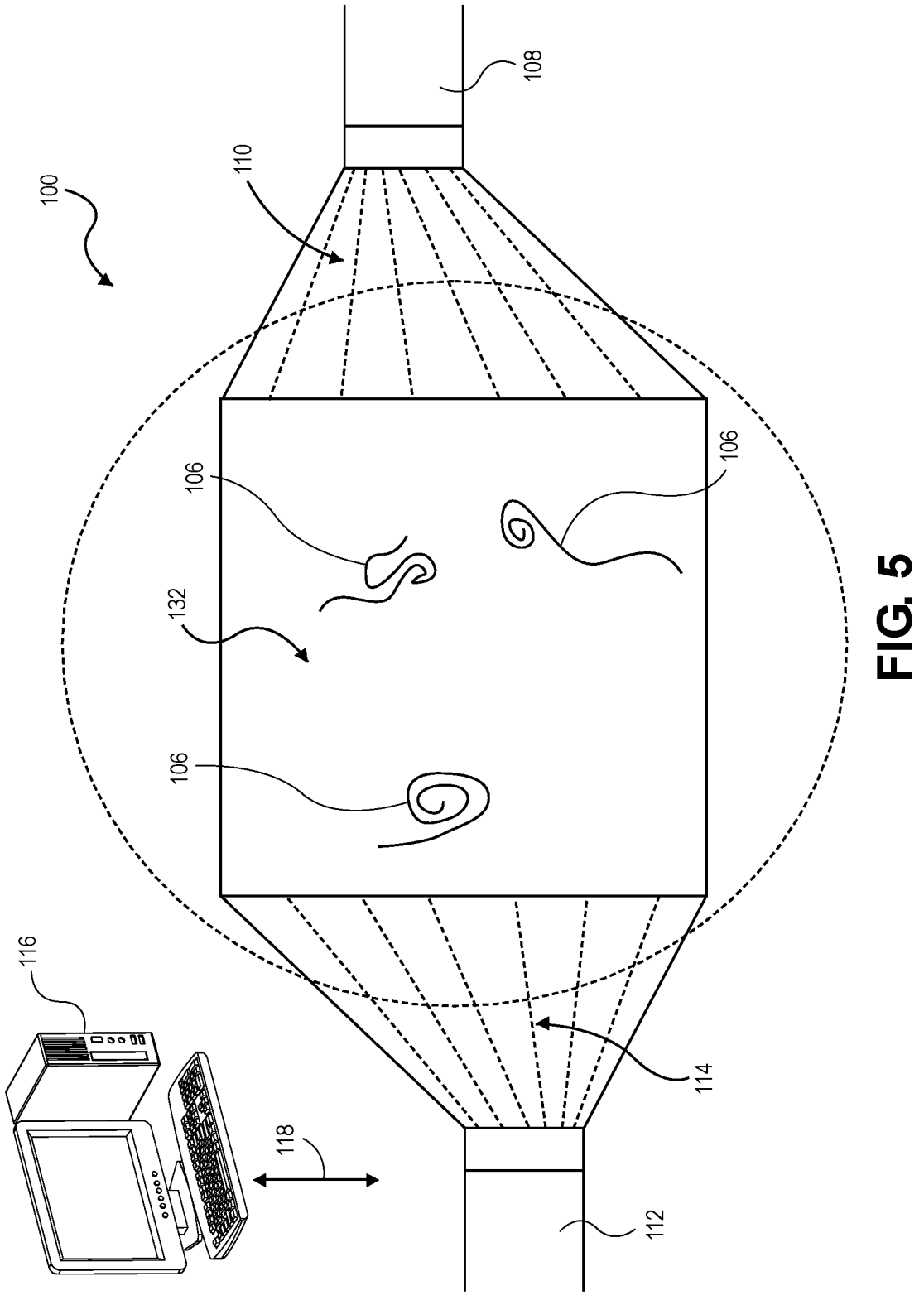
FIG. 5 is a top perspective view of a third embodiment of tamper-evident glass comprising colorants.

FIG. 5 depicts and exemplary embodiment of tamper-evident glass 100 comprising optional or additional dyes or other colorants such as colorants 132, which may provide an additional level of uniqueness or identifying property for anti-tampering purposes. By way of non-limiting example, colorants 132 may be pigmented dyes mixed with the glass powder mixture and may be present during the manufacturing of tamper-evident glass 100. By way of another non-limiting example, colorants 132 may be added to a molten glass mixture, such as during a glass blowing manufacturing process. Colorants 132 may be mixed and dispersed throughout a finally formed tamper-evident glass 100. Similar to inorganic fluorescent material 104 and/or crystals 130, colorants may be randomly or intermittently dispersed throughout the dimensions of tamper-evident glass 100, providing for a unique or near unique patterning 106 within tamper-evident glass 100. Accordingly, in some embodiments, a single piece of tamper-evident glass 100 may comprise a unique patterning 106 of inorganic fluorescent material 104, crystals 130, or colorants 132, or any combination thereof.

In addition to providing an additional level of unique identifiers, colorants 132 may further be used to aid in the location and/or visibility of inorganic fluorescent material 104 and/or crystals 130. For example, during the crystallization process, colorants 132 may be added to the crystal growing sites, adding coloring to crystals 130 which may aid in identifying crystals 130. In some embodiments, the added colorants 132 or dyes may comprise a visible pigment, providing crystals 130 with a visible color that may be seen by a naked eye observer. In further embodiments, the added colorants 132 may comprise a UV or other light excitable colorant or material. In even further embodiments tamper-evident glass 100 may comprise natural colorants providing a color to tamper-evident glass 100 without the use of added pigments, dyes, or other colorants. In such embodiments, crystals 130 may be colorless and provide a contrast to the color of the tamper-evident glass 100.

As described above, tamper-evident glass 100 may be formed through multiple glass making procedures and methods and may be molded or formed into a variety of shapes and may be dependent on the application of tamper-evident glass. Similar to the shape and design of tamper-evident glass, the method of placement of tamper-evident glass 100 may likewise be dependent on the intended location of placement of tamper-evident glass 100. For example, in some embodiments, tamper-evident glass 100 may be sealed to a metal strip, such as a component within a printed circuit board. In further embodiments, an adhesive may be applied to tamper-evident glass 100 for placing tamper-evident glass 100 on a plastic substrate. In even further embodiments, tamper-evident glass 100 may be molded for placement around cables or wires. The examples of placement are intended to be non-limiting examples, and it will be appreciated that tamper-evident glass 100 may be used in a variety of setting and applications not specifically described herein but may be used in any setting or application in which glass may be used or implemented.

Figure 6:
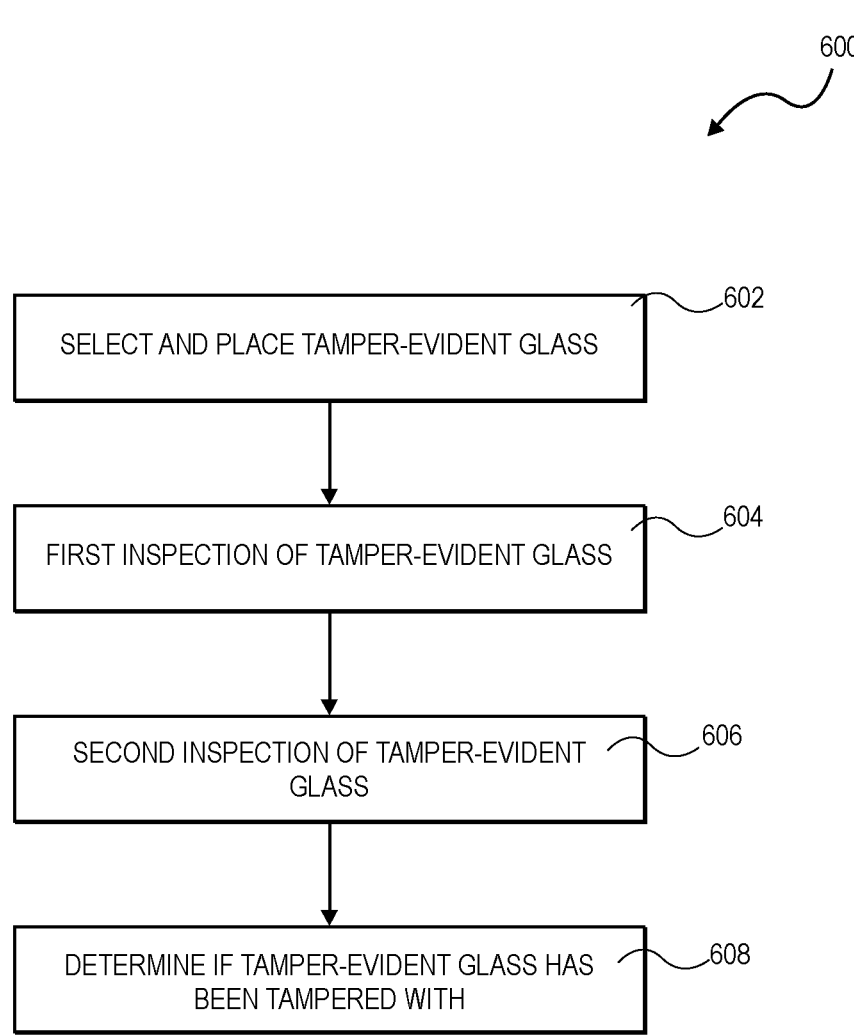
FIG. 6 is a flowchart depicting an exemplary embodiment of using the tamper-evident glass in accordance with some embodiments of the invention.

In some embodiments, the present invention may be used in a method for securing an object with a tamper-evident tool. An exemplary method of use is depicted as a flowchart in FIG. 6 and referenced by reference numeral 600. First, at a step 602, a piece of tamper-evident glass 100 may be selected and placed in a security location, such as around an object or as a layer of a multi-layered object. For example, in some embodiments, tamper-evident glass 100 may be molded or otherwise formed as a loop seal for surrounding an object, such as cables. In further embodiments, tamper-evident glass 100 may be molded or otherwise formed as a planar layer for placement on a printed circuit board. However, it will be appreciated that the placement and object tamper-evident glass 100 is used for providing a tamper-evident or anti-tampering effect is variable and may be any conceivable object or placement.

Next, at a step 604, an initial state of the tamper-evident glass 100 may be established and which may be used as a baseline image or status for a later comparison. For example, in some embodiments, tamper-evident glass 100 may comprise a unique, or near unique, distribution of tamper-evident elements 102. For example, tamper-evident elements 102 may be arranged in a pattern 106, consisting of a pre-arranged or pre-determined symbol, image, or distribution, or alternatively, may be randomly distributed. In some embodiments, the first inspection 604 may comprise the taking of an electronic, digital, or other computerized scan of the tamper-evident glass 100, the tamper-evident elements 102, and/or patterning 106. The electronic scan of tamper-evident glass may be completed by digital scanner 112 or another peripheral device capable of conducing a digital scan. Through the digital scanning, a digital file or digital image of the then current state of tamper-evident glass 100 may be created and uploaded to a computer, smartphone, or tablet, including for example, computer 116. The digital file or digital image of tamper-evident glass 100 may comprise a cataloging or recording of the position and/or state of tamper-evident elements 102 and/or patterning 106. In further embodiments, first inspection 604 may optionally or additionally comprise a naked-eye inspection of tamper-evident glass 100. In even further embodiments, first inspection 604 may optionally or additionally comprise the taking of a photograph or video of tamper-evident glass 100 using a peripheral such as a camera or video recorder. Regardless of the method of inspection, first inspection 604 may provide for a first status of tamper-evident glass 100 providing a baseline for later comparison.

A period of time may elapse in which the tamper-evident glass 100 may be left alone or otherwise out of view. The period of time may be a predetermined period of time or for an indefinite time. In further embodiments, tamper-evident glass 100 may be inspected at regular or predetermined intervals, or on a specific date.

Next, at a step 606, after the period of time has passed since first inspection 604 a second inspection of tamper-evident glass 100 may take place. The manner of second inspection 606 may be similar to the process of first inspection 604 as described above. For example, second inspection 606 may also comprise the digital scanning of tamper-evident glass 100 using digital scanner 112 or another peripheral device, such as a camera or video recorder. In some embodiments, second inspection 606 may include the creation of a digital file or image detailing the status of tamper-evident glass 100 through the digital scanning caused by digital scanner 112. For example, during second inspection 606 the digital scanning of tamper-evident glass 100 may determine whether any cracks, breaks, or fractures have been introduced to tamper-evident glass 100, tamper-evident elements 102, and/or patterning 106. Furthermore, in addition to the scanning of tamper-evident glass, second inspection 606 may further determine the positioning of tamper-evident elements 102 and/or the position and location of patterning 106. Even further, second inspection 606 may discover the absence of tamper-evident elements 102. The digital file or image may then be transmitted to computer 116 for comparison with the digital file or image created during first inspection 604. In further embodiments, second inspection 606 may comprise only a visual inspection of tamper-evident glass 100 without the creation of a digital image or digital file.

Finally, at a step 608, a comparison and determination can be made as to whether tamper-evident glass 100 or the object has been tampered with. For example, following the uploading of the digital files created during first inspection 604 and second inspection 606, a software running on computer 116 may compare the two digital files. Through such comparison, the location and status of tamper-evident elements and/or patterning 106 may occur. For example, comparison 608 may compare each of the tamper-evident elements 102 as identified in the digital files and a determination may be made as to whether the tamper-evident elements 102 are in the same location and in the same state from first inspection 604 to second inspection 606. For example, in some embodiments the presence of new or additional cracks or breaks in one or more of the tamper-evident elements 102 may provide an indication that tamper-evident glass 100 has been tampered with. Even further, in some embodiments, a different patterning 106, or the lack of patterning 106, may also provide an indication that tamper-evident glass 100 has been tampered with. Ultimately, during comparison 608 through the comparison of digital files, a determination may be made as to whether tamper-evident glass 100 has been tampered with or replaced.

Following the determination made in comparisons 608, different options may be presented. If the determination is made that no new cracks or breaks have been imprinted into one or more tamper-evident elements 102, or if patterning 106 is the same and intact, then there may be a reasonable certainty that the tamper-evident glass 100 has not been tampered with. Upon such a determination, another period of time may pass and steps 606 and 608 may be repeated. If the determination has been made that tamper-evident glass 100 and/or the object have been tampered with, appropriate steps to remedy any potential issue or problem arising from a tampering attempt may occur.

Figure 7:
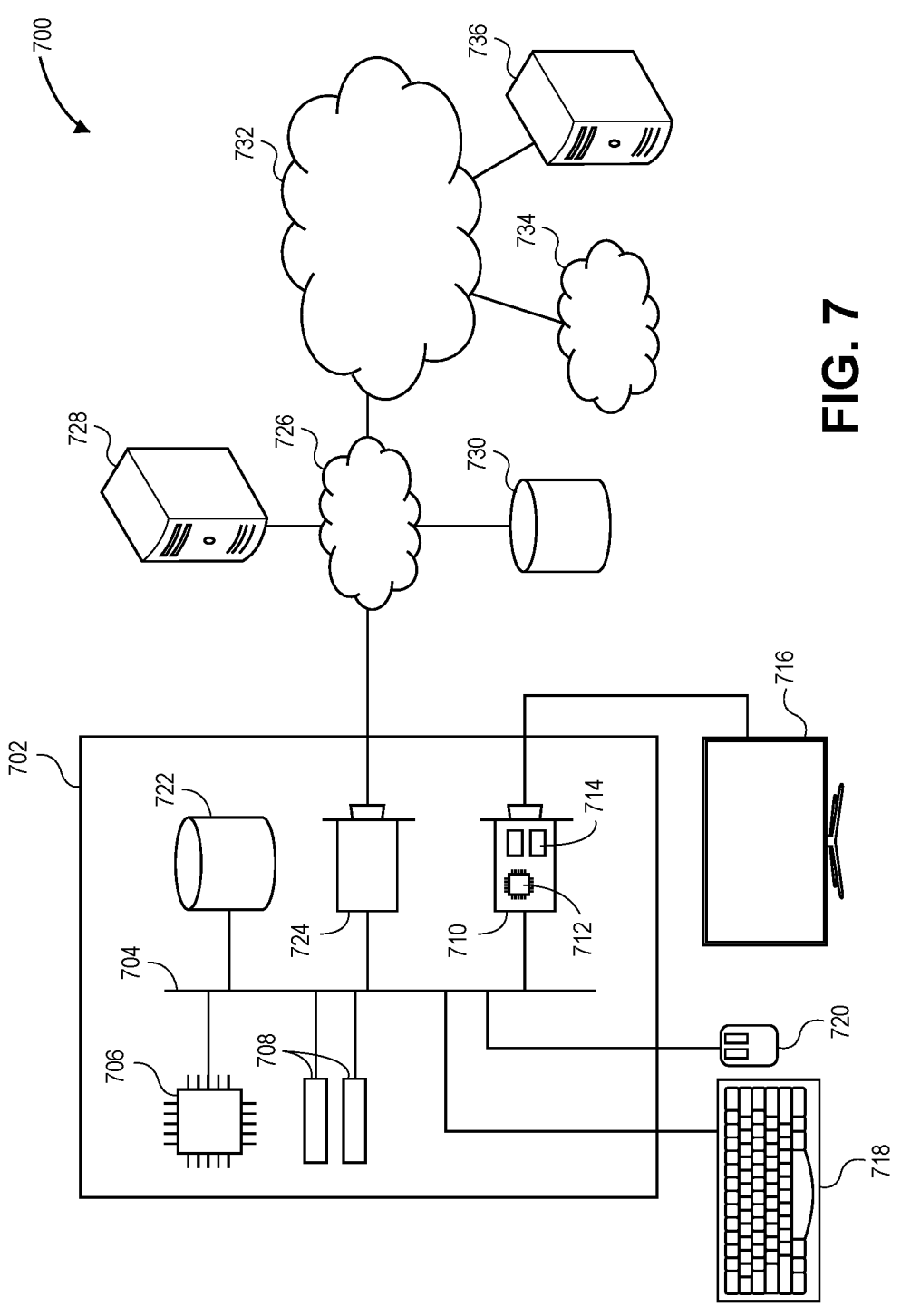
FIG. 7 is an exemplary hardware platform for certain embodiments of the invention.

FIG. 7 illustrates an exemplary hardware platform for certain embodiments of the invention. Computer 702 can be a desktop computer, a laptop computer, a server computer, a mobile device such as a smartphone or tablet, or any other form factor of general- or special-purpose computing device. Depicted with computer 702 are several components, for illustrative purposes. In some embodiments, certain components may be arranged differently or absent. Additional components may also be present. Included in computer 702 is system bus 704, whereby other components of computer 702 can communicate with each other. In certain embodiments, there may be multiple busses, or components may communicate with each other directly. Connected to system bus 704 is central processing unit (CPU) 706. Also attached to system bus 704 are one or more random-access memory (RAM) modules 708. Also attached to system bus 704 is graphics card 710. In some embodiments, graphics card 724 may not be a physically separate card, but rather may be integrated into the motherboard or the CPU 706. In some embodiments, graphics card 710 has a separate graphics-processing unit (GPU) 712, which can be used for graphics processing or for general purpose computing (GPGPU). Also on graphics card 710 is GPU memory 714. Connected (directly or indirectly) to graphics card 710 is display 716 for user interaction. In some embodiments, no display is present, while in others it is integrated into computer 702. Similarly, peripherals such as keyboard 718 and mouse 720 are connected to system bus 704. Like display 716, these peripherals may be integrated into computer 702 or absent. In some embodiments, additional peripherals such as a microphone or video camera may also be present and connected to system bus 704. In some embodiments, such peripherals may be detachable connected to computer 702 via a wired or wireless connection. In other embodiments, such as a tablet or smartphone, these peripherals are integrated into computer 702. Also connected to system bus 704 is local storage 722, which may be any form of computer-readable media and may be internally installed in computer 702 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 724 is also attached to system bus 704 and allows computer 702 to communicate over a network such as network 726. NIC 724 can be any form of network interface known in the art, such as Ethernet, ATM, fiber, Bluetooth, or Wi-Fi (i.e., the IEEE 802.11 family of standards). NIC 724 connects computer 702 to local network 726, which may also include one or more other computers, such as computer 728, and network storage, such as data store 730. Generally, a data store such as data store 730 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 728, accessible on a local network such as local network 726, or remotely accessible over Internet 732. Local network 726 is in turn connected to Internet 732, which connects many networks such as local network 726, remote network 734 or directly attached computers such as computer 736. In some embodiments, computer 702 can itself be directly connected to Internet 732.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A method of detecting damage to an object having a tamper-evident glass, the method comprising:
capturing a first image of a first position of a patterning of a plurality of tamper-evident objects at a first time, wherein the plurality of tamper-evident objects comprises crystal objects;
wherein the patterning is formed from growing the plurality of tamper-evident objects at one or more selectively positioned crystal growth sites within at least a portion of the tamper-evident glass, the tamper-evident glass formed from at least a glass powder and a nucleating agent;
capturing a second image of a second position of the patterning of the plurality of tamper-evident objects at a second time;
analyzing the first image and the second image to determine a difference between the first position at the first time and the second position at the second time of the plurality of tamper-evident objects; and
determining whether the damage has been introduced to the tamper-evident glass based on the difference between the first position and the second position of the plurality of tamper-evident objects.

2. The method of claim 1,
wherein the tamper-evident glass further comprises a second plurality of tamper-evident objects dispersed throughout at least the portion of the tamper-evident glass,
wherein the second plurality of tamper-evident objects comprises at least one of inorganic fluorescent objects or pigmented colorants.

3. The method of claim 1, further comprising:
performing a first inspection of the object to determine the first position,
wherein the first inspection includes a first digital scanning of the tamper-evident glass to determine a first distribution of the plurality of tamper-evident objects.

4. The method of claim 3, further comprising:
responsive to the first digital scanning, creating a first digital file of the first distribution of the plurality of tamper-evident objects,
wherein the first digital file comprises the first image.

5. The method of claim 4, further comprising:
performing a second inspection of the object to determine the second position,
wherein the second inspection includes a second digital scanning of the tamper-evident glass to determine a second distribution of the plurality of tamper-evident objects.

6. The method of claim 5, further comprising:
responsive to the second digital scanning, creating a second digital file of the second distribution of the plurality of tamper-evident objects,
wherein the second digital file comprises the second image.

7. The method of claim 6, wherein visually determining whether the damage has been introduced includes a comparison between the first digital file and the second digital file.

8. The method of claim 7, further comprising:
responsive to a determination that the damage has not occurred, waiting a length of time, and repeating performing the second inspection and visually determining whether the damage has been introduced.

9. A tamper-evident glass comprising:
a glass structure formed from at least a glass powder and a nucleating agent; and
a patterning formed within the glass structure, the patterning formed from growing a plurality of tamper-evident elements at one or more selectively positioned crystal growth sites within at least a portion of the glass structure, wherein the plurality of tamper-evident elements comprise crystal objects, wherein a difference in positioning of the plurality of tamper-evident elements indicates if damage has occurred to the tamper-evident glass based at least in part on a comparison of a first position of the plurality of tamper-evident elements at a first time to a second position of the plurality of tamper-evident elements at a second time.

10. The tamper-evident glass of claim 9, wherein the plurality of tamper-evident elements is a first plurality of tamper-evident elements in a first patterning, wherein the tamper-evident glass further comprises a second plurality of tamper-evident elements dispersed throughout at least the portion of the glass structure and arranged in a second patterning, wherein the patterning is the first patterning.

11. The tamper-evident glass of claim 10, wherein the second plurality of tamper-evident elements comprises at least one of inorganic fluorescent objects or pigmented colorants.

12. The tamper-evident glass of claim 11, wherein at least one of the first patterning or the second patterning is a pre-determined design.

13. The tamper-evident glass of claim 11, wherein at least one of the first patterning or the second patterning is a random distribution.

14. A tamper-evident glass comprising:

a glass structure formed from at least a glass powder and a nucleating agent;

a first plurality of tamper-evident objects comprising crystal objects;

a patterning formed within the glass structure, the patterning formed from growing the first plurality of tamper-evident objects at one or more selectively positioned crystal growth sites within at least a portion of the glass structure; and a second plurality of tamper-evident objects comprising colorants dispersed throughout at least a second portion of the glass structure, wherein a difference in positioning of at least one of the first plurality of tamper-evident objects or the second plurality of tamper-evident objects indicates if damage has occurred to the tamper-evident glass by comparing a first position at a first time to a second position at a second time of at least one of the first plurality of tamper-evident objects or the second plurality of tamper-evident objects.

15. The tamper-evident glass of claim 14, further comprising a third plurality of tamper-evident objects comprising inorganic fluorescent objects dispersed throughout at least a third portion of the glass structure.

16. The tamper-evident glass of claim 14, wherein the second plurality of tamper-evident objects facilitates visibility of the first plurality of tamper-evident objects.

17. The tamper-evident glass of claim 16, wherein the second plurality of tamper-evident objects provides the first plurality of tamper-evident objects with a color that is visible to a naked eye observer.

18. The tamper-evident glass of claim 14, wherein the colorants comprise a light excitable material.

19. The tamper-evident glass of claim 14, wherein the colorants are added to a molten glass mixture during a manufacturing of the glass structure.

20. The tamper-evident glass of claim 14, further comprising:

a first patterning of the first plurality of tamper-evident objects, wherein the first patterning includes at least one of a first shape or a first size of the first plurality of tamper-evident objects within the glass structure; and a second patterning of the second plurality of tamper-evident objects, wherein the second patterning includes at least one of a second shape or a second size of the second plurality of tamper-evident objects within the glass structure, wherein the patterning is the first patterning.

* * * * *